A. H. MORREL.
Cotton-Planter.
No. 12,867. Patented May 15, 1855.
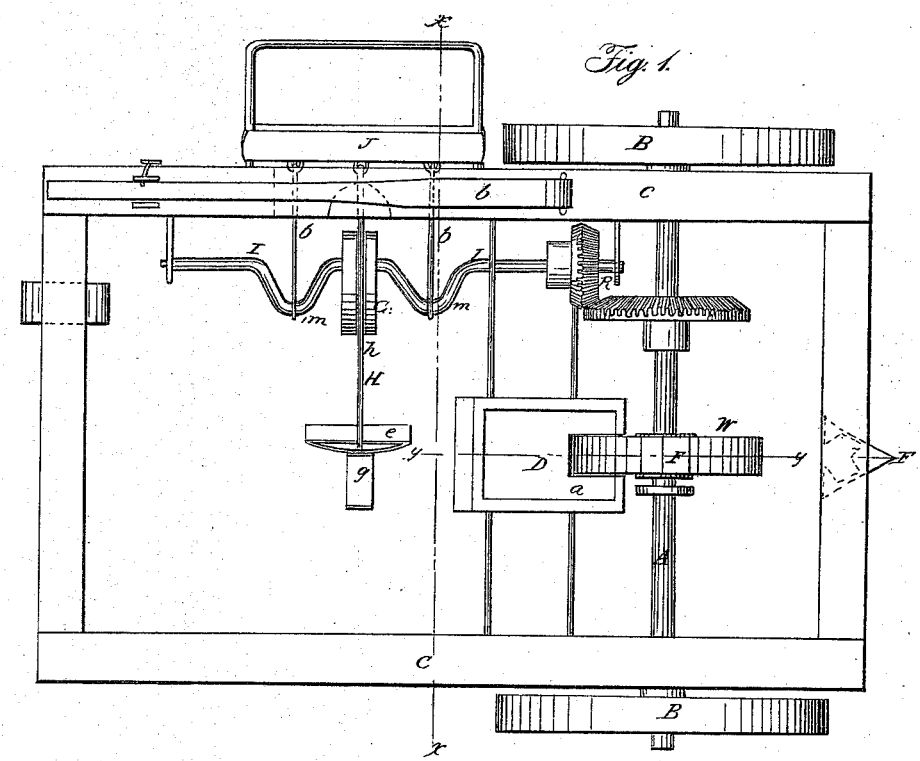
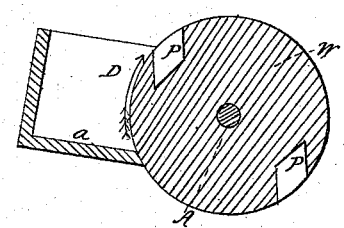
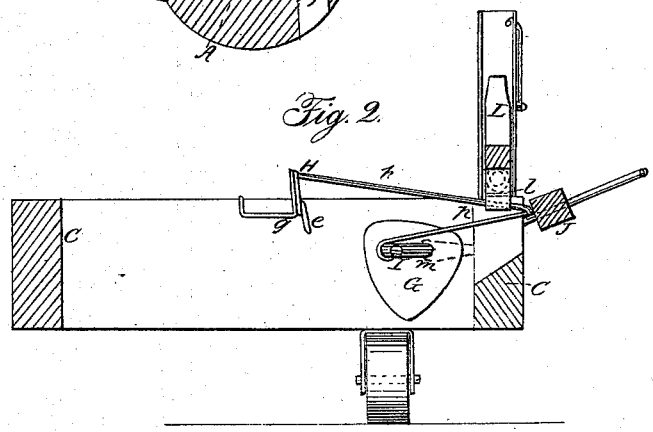

UNITED STATES PATENT OFFICE.

A. H. MORREL, OF MARLIN, TEXAS.

IMPROVEMENT IN COTTON-SEED PLANTERS.

Specification forming part of Letters Patent No. 12,867, dated May 15, 1855.

*To all whom it may concern:*

Be it known that I, A. H. MORREL, of Marlin, in the county of Falls and State of Texas, have invented a new and useful Improvement in Cotton-Seed Planters; and I do hereby declare that the following is a full, clear, and exact description of the construction and operation of the same, reference being had to the annexed drawings, forming part of this specification, in which—

Figure 1 is a top view of the planter. Fig. 2 is a vertical section on line $x\ x$, looking toward cam G. Fig. 3 is a section perpendicular to main axle of dropping-wheel and hopper on line $y\ y$.

Similar characters of reference in the several figures denote the same parts of the planter.

The invention here considered refers to the covering arrangement, which consists of a hoe operating transversely by a combination of eccentrics, cams, and slides from the rotation of the main axle.

In the drawings, A is the main axle, and B the wheels. Suspended between the sides of the frame C is the hopper D, having an inclined bottom, $a$, running toward the dropping-wheel $w$. This wheel is upon the main shaft, arranged with any suitable clutch, so as to be thrown into and out of gear at the will of the operator. It has within its periphery a number of pockets, P, and passes up through the front of the hopper D, so that as the wheel revolves in the direction of the arrow the seed will slide from the bottom $a$ into the pockets and be carried upward and discharged by their gravity into the furrow made by the opener F. The pockets P may be close together, so that the discharge will be nearly continuous; or there may be a limited number, so that the seed will be dropped at intervals.

In rear of the hopper is the coverer H, consisting of blade $e$, handle $h$, and gage $g$. The handle rests on a cam, G, secured to an eccentric shaft, I, and is attached by its extremity to the sliding bar J, to which a reciprocating motion is given by its connection with the eccentric portions of $m$ of the shaft I through rods $p$. Motion is given the shaft I by the bevel-gear R, so that as the main shaft revolves the coverer has a reciprocating motion across the furrow simultaneously with a vertical motion produced by the cam G, which causes the blade $e$ to enter the earth when the slide J is in the position shown in Fig. 1, and, after covering the seed, maintain an elevated position during its backward motion, the necessary adjustments depending on the eccentricity of shaft, form of cam, and nature of gearing. The gage $g$ may be sliding, so as to regulate the amount of earth collected at each stroke. When not required to be in operation the coverer can be lifted from the cam G by means of lever L and loop $l$, as shown in Fig. 2.

What I claim as my invention, and desire to secure by Letters Patent, is—

The combination of sliding bar J, coverer H, cam G, and eccentric shaft I, or their equivalents, arranged and operating substantially as hereinbefore set forth.

In testimony whereof I have hereunto signed my name before two subscribing witnesses.

A. H. MORREL.

Witnesses:
JOHN L. SMITH,
JAS. D. CLARY.